Sept. 12, 1967     F. K. MITTRY, JR., ET AL     3,340,627
WHEEL TYPE EXCAVATING APPARATUS
Original Filed March 5, 1962     14 Sheets-Sheet 1
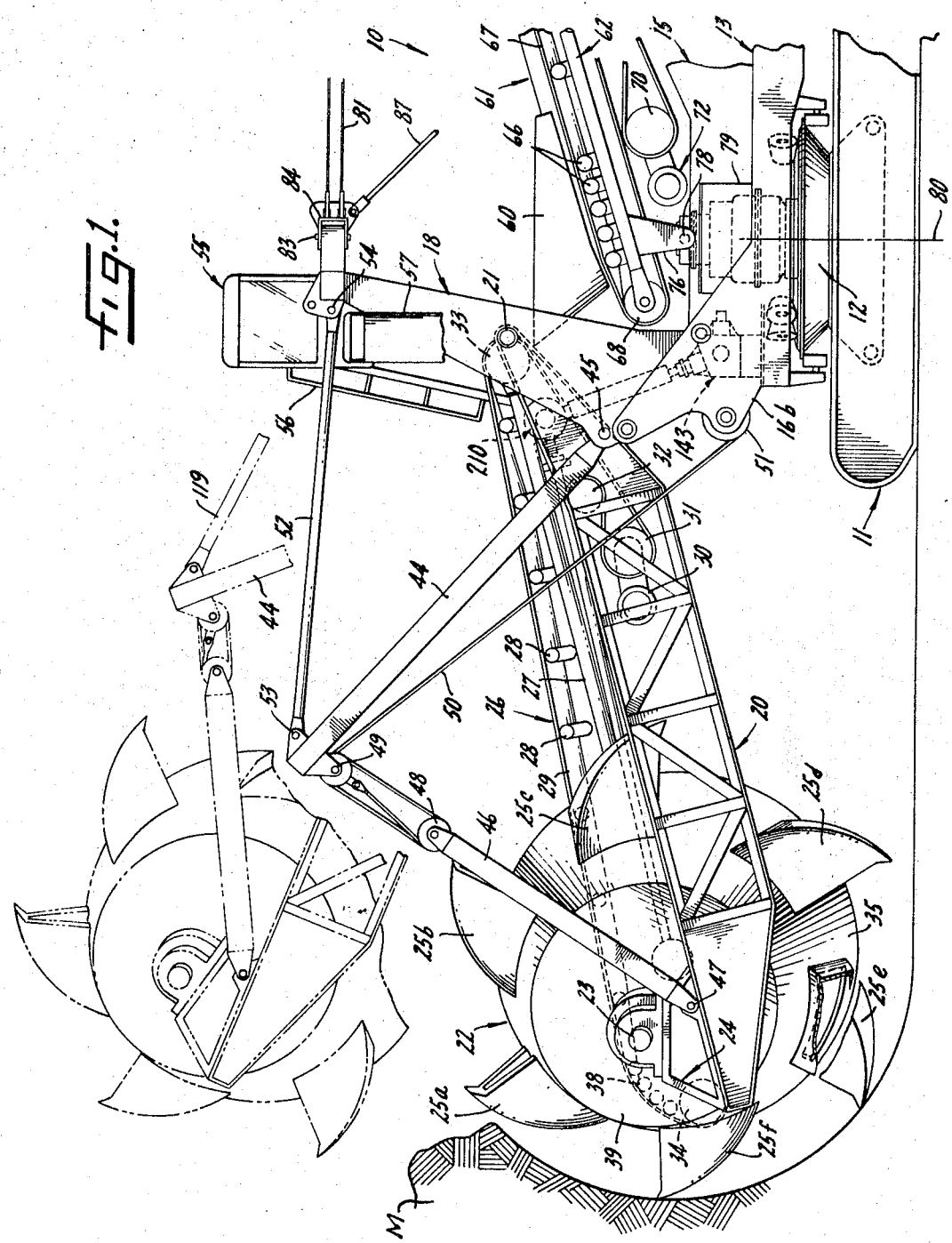
INVENTORS
CARL A. WILMS
FOUAD K. MITTRY, JR.
BY
*Parker & Carter*
ATTORNEYS.

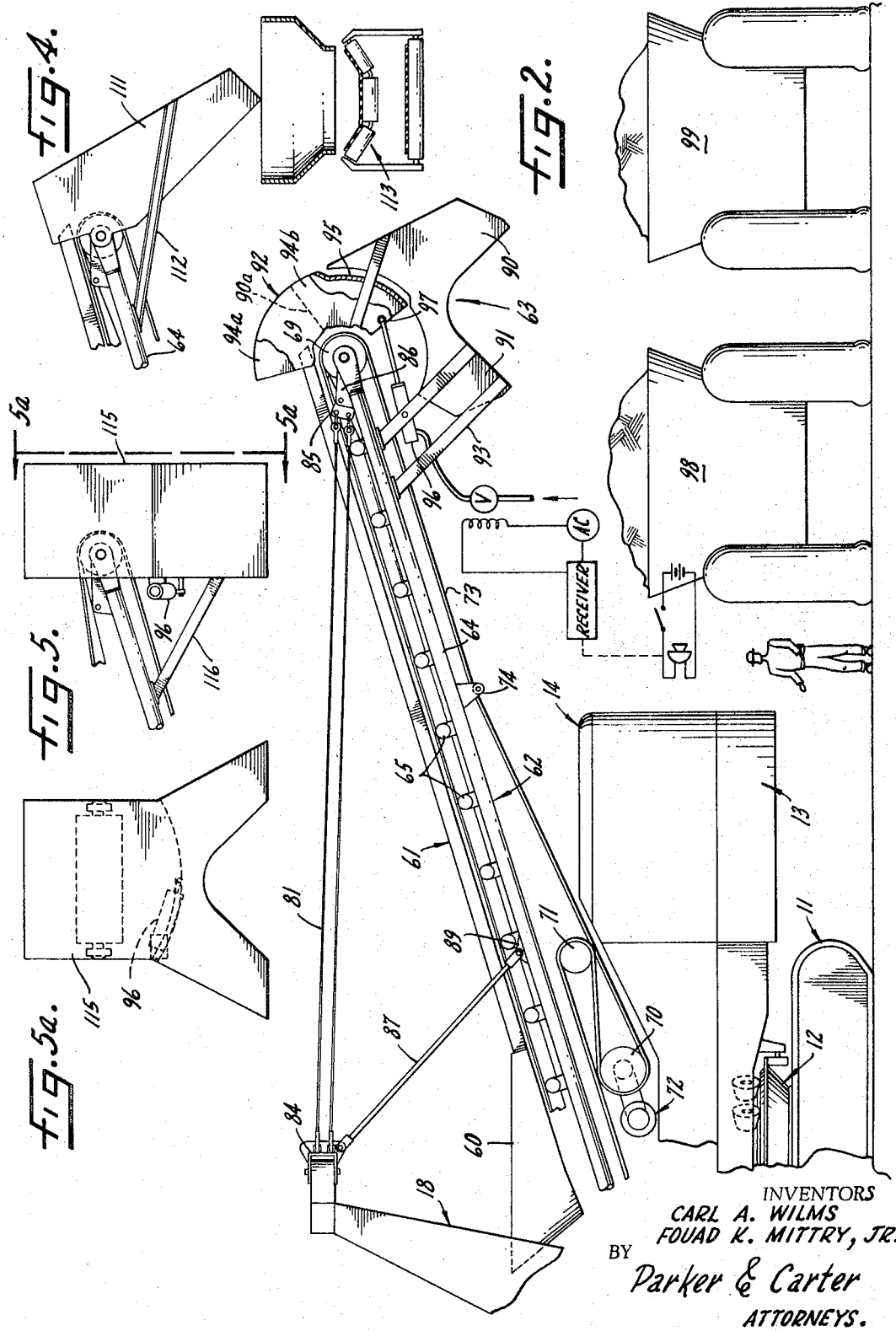

Sept. 12, 1967 F. K. MITTRY, JR., ET AL 3,340,627
WHEEL TYPE EXCAVATING APPARATUS
Original Filed March 5, 1962 14 Sheets-Sheet 3
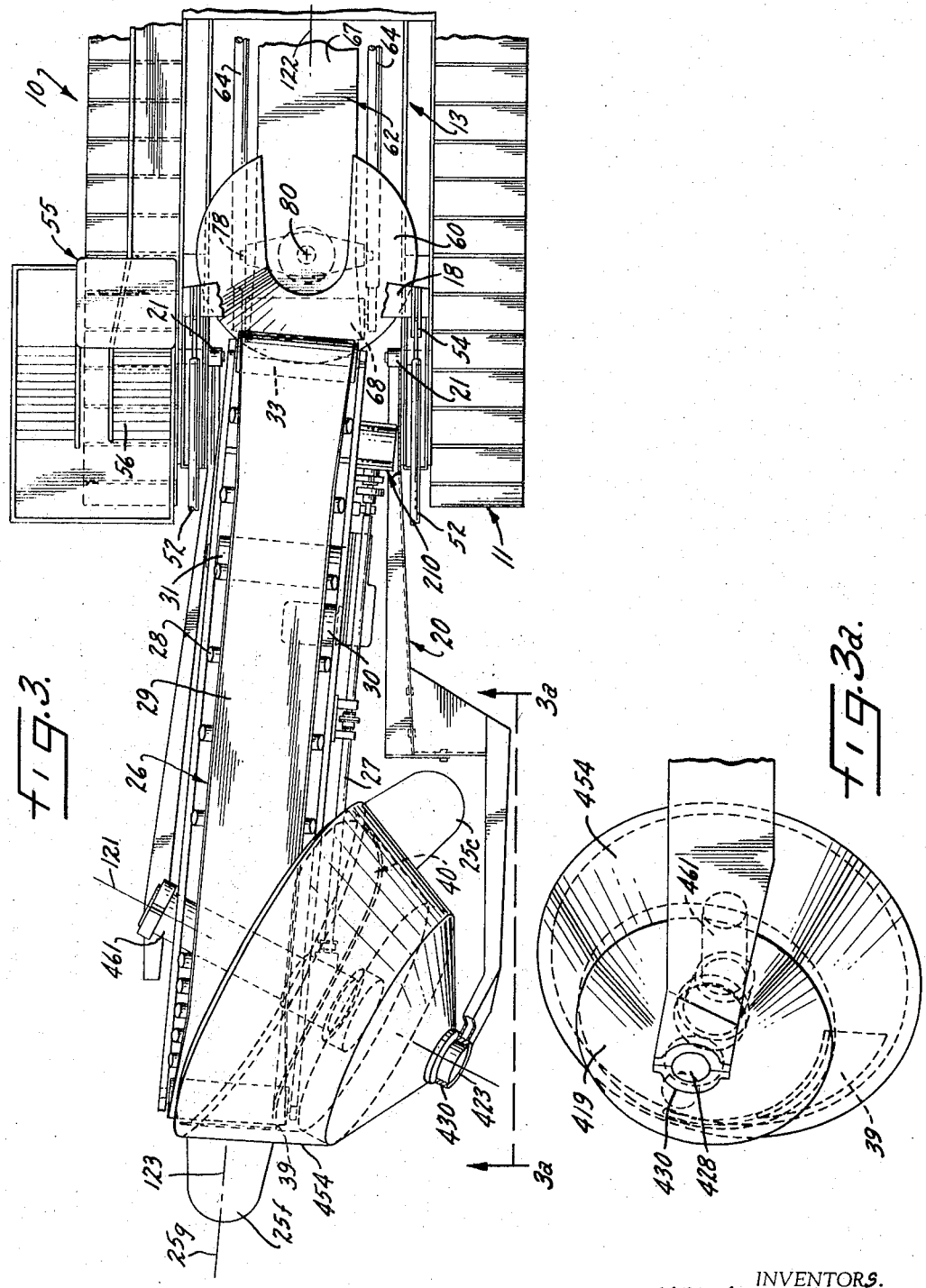
INVENTORS.
CARL A WILMS
FOUAD K MITTRY, JR.
BY Parker & Carter
ATTORNEYS.

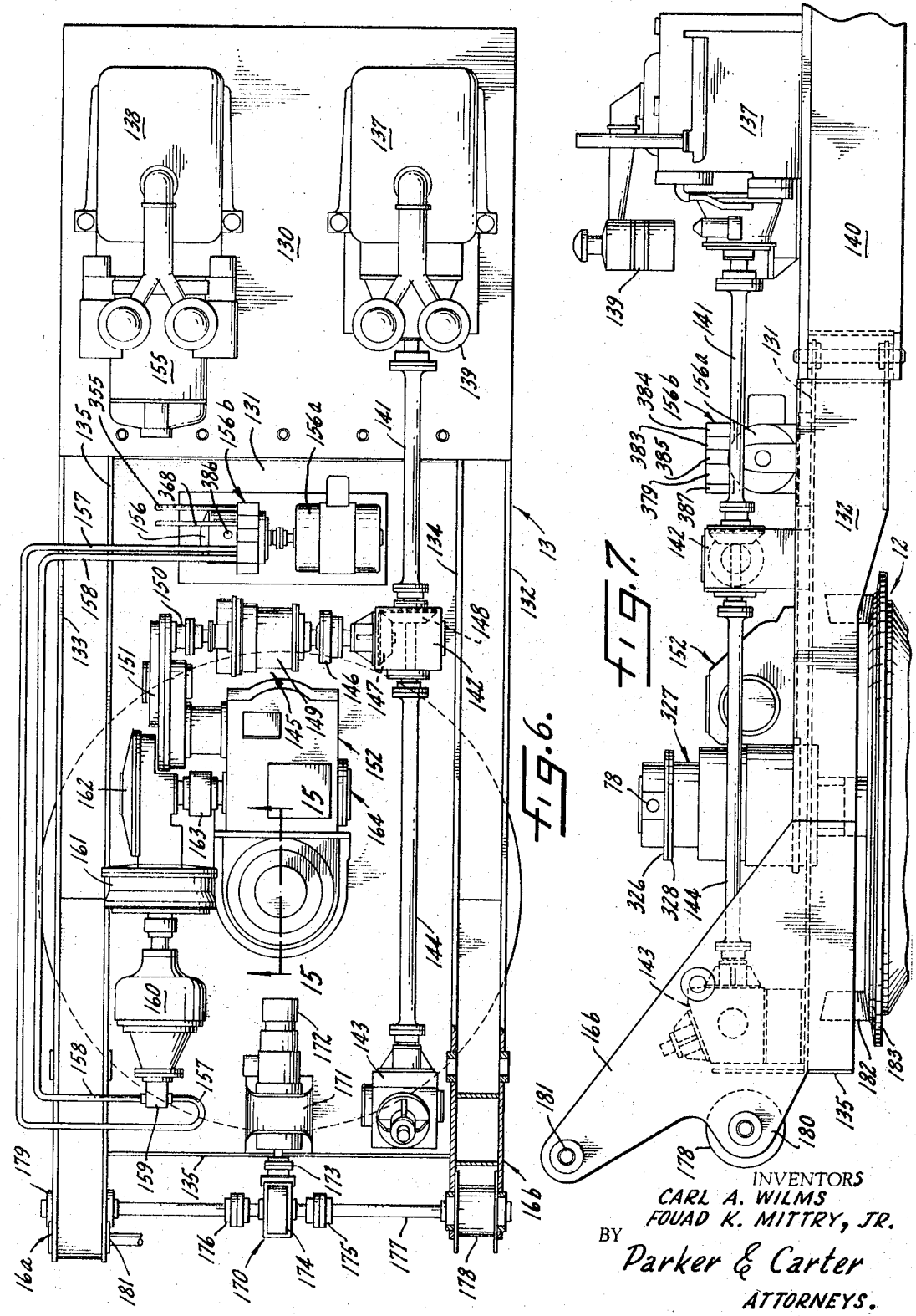

Sept. 12, 1967     F. K. MITTRY, JR., ET AL     3,340,627
WHEEL TYPE EXCAVATING APPARATUS
Original Filed March 5, 1962     14 Sheets-Sheet 5
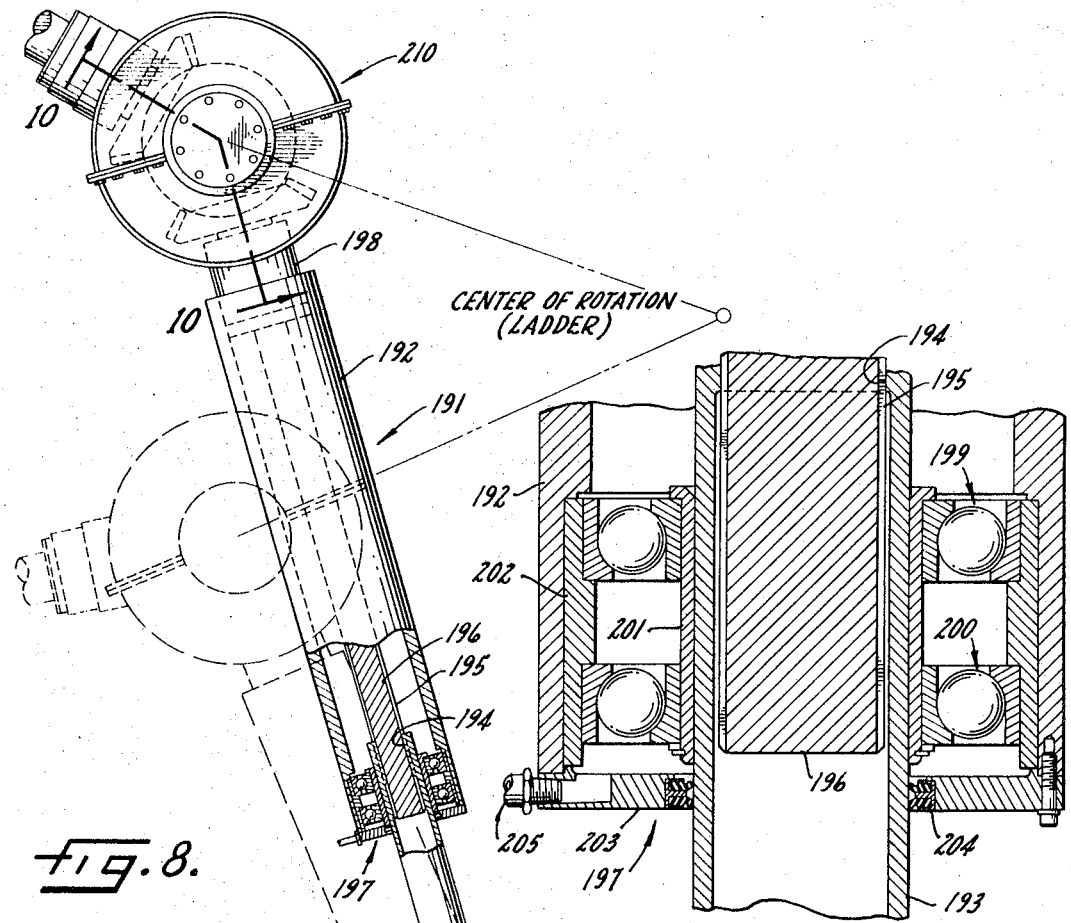
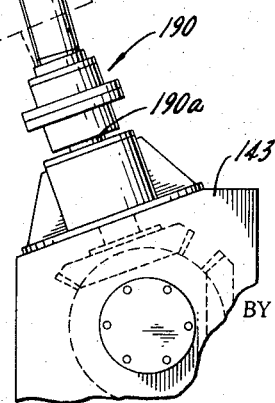
INVENTORS
CARL A. WILMS
FOUAD K. MITTRY, JR.
BY *Parker & Carter*
ATTORNEYS.

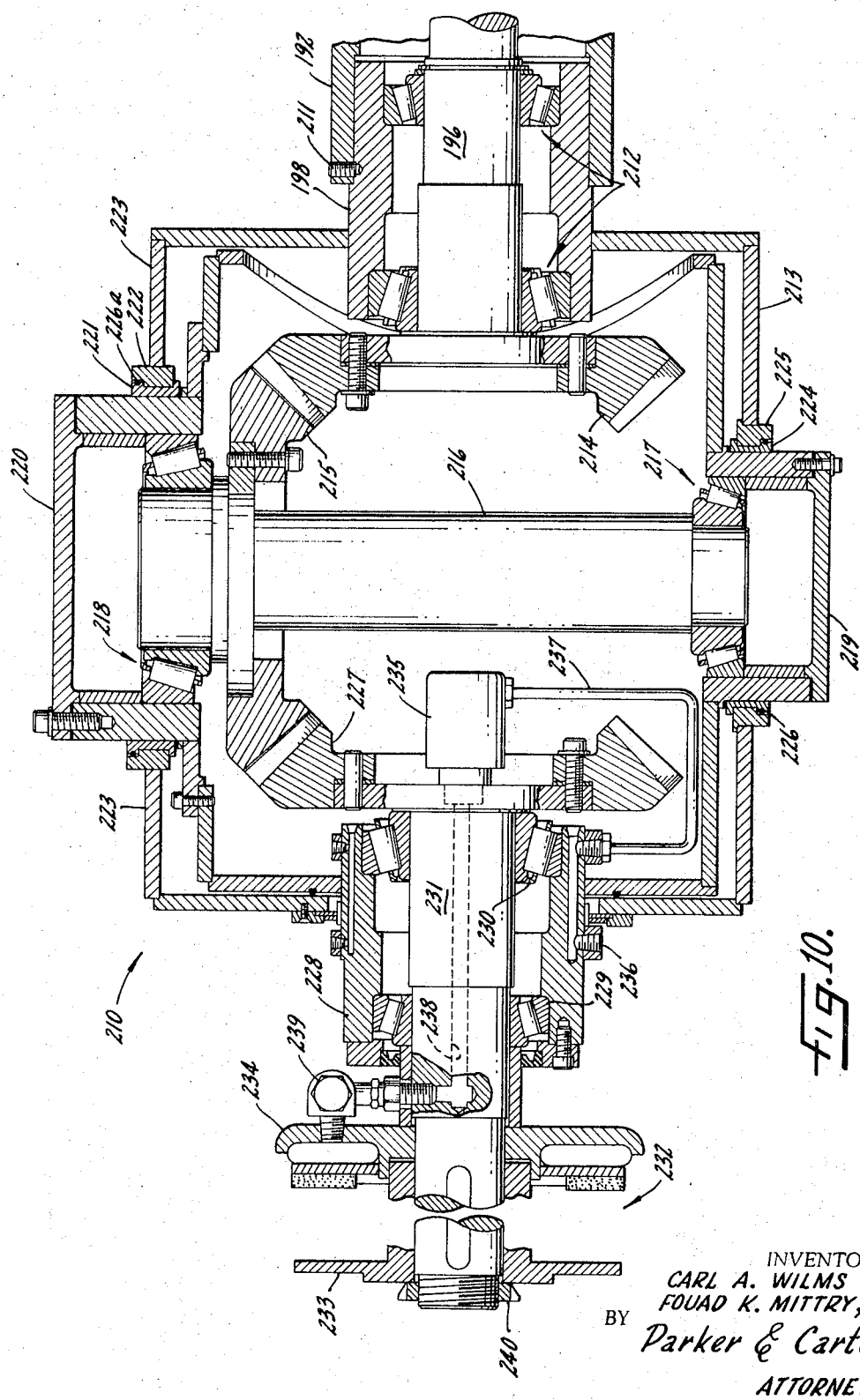

INVENTORS
CARL A. WILMS
FOUAD K. MITTRY, JR.
BY Parker & Carter
ATTORNEYS.

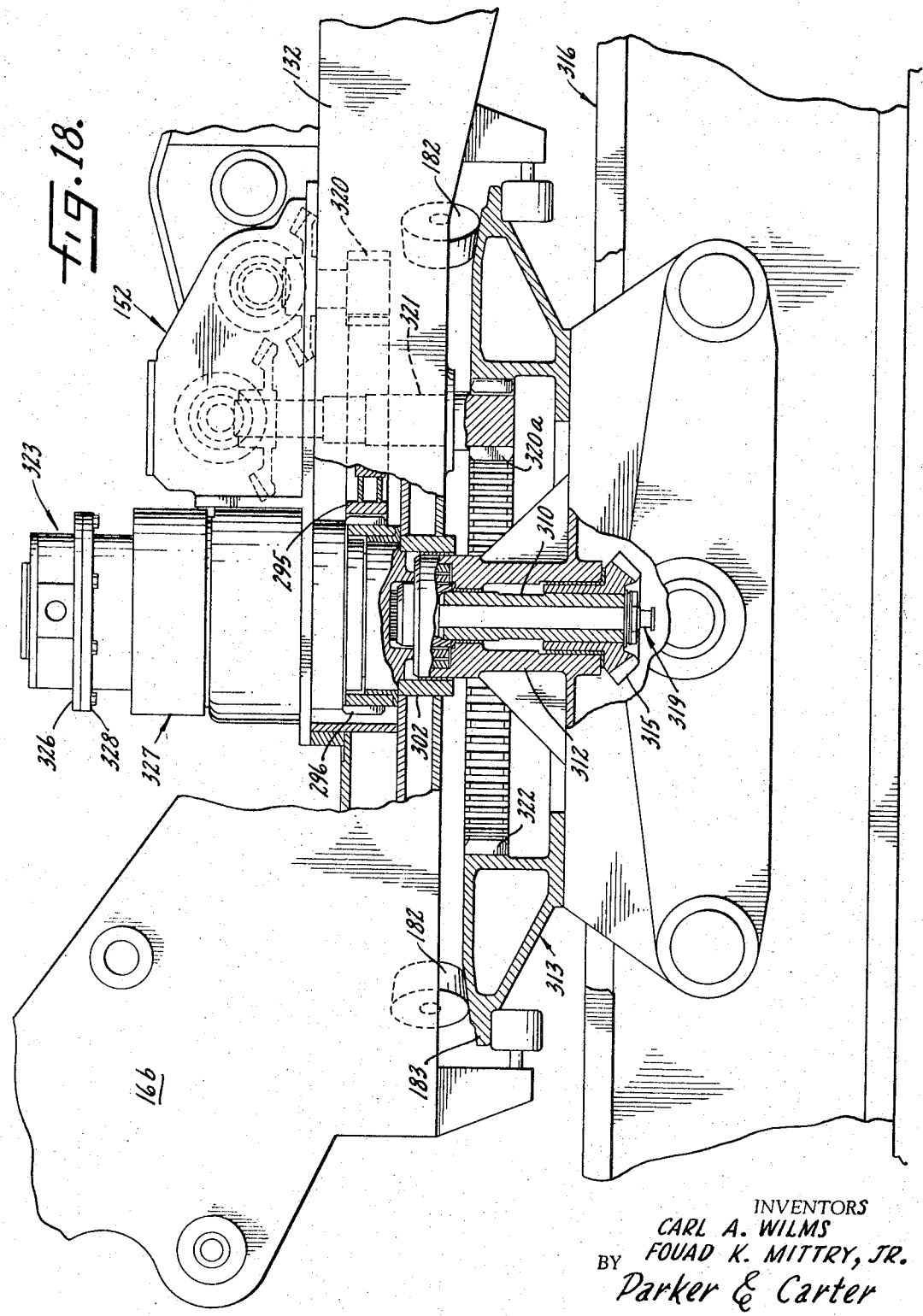

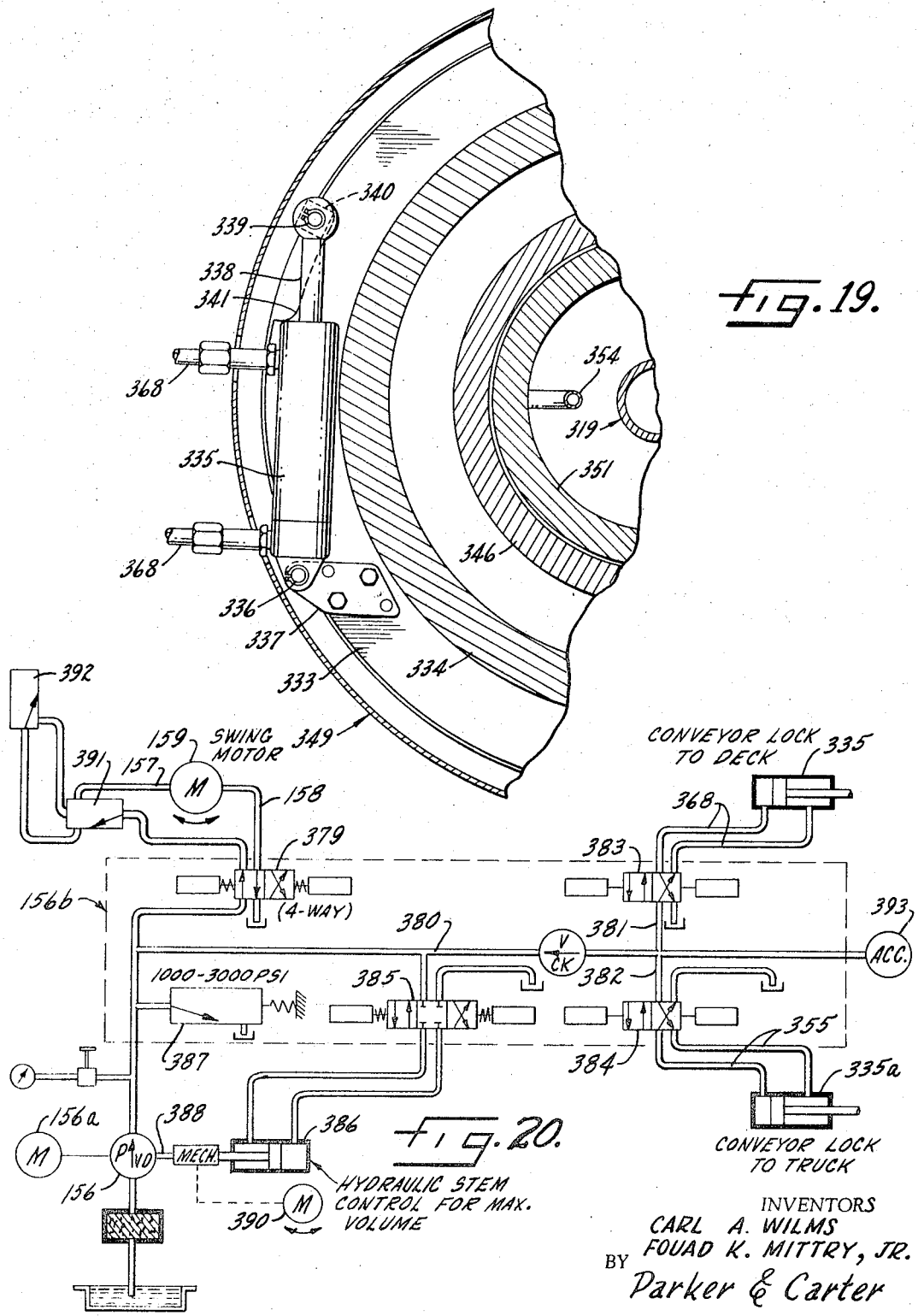

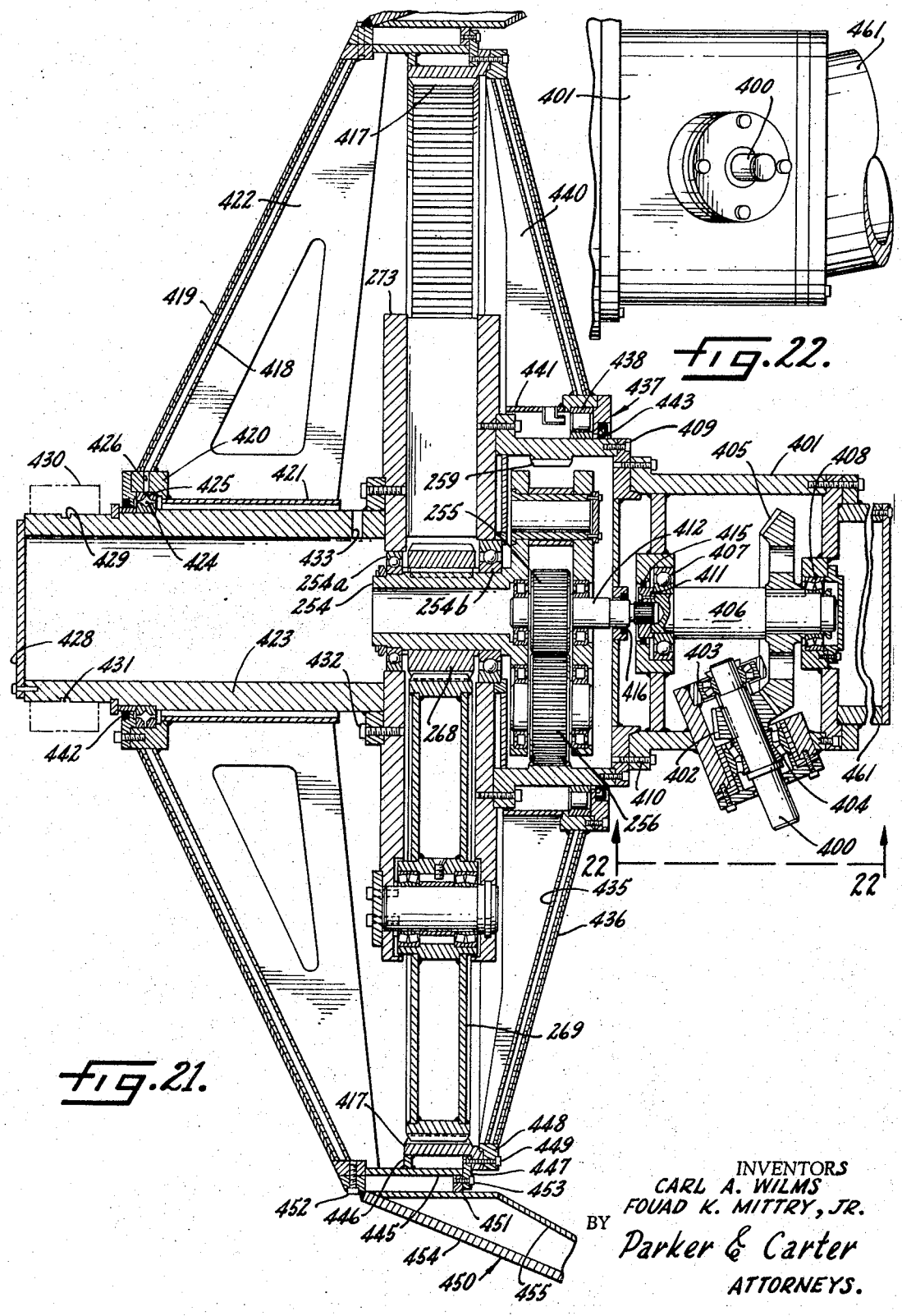

United States Patent Office 3,340,627
Patented Sept. 12, 1967

3,340,627
WHEEL TYPE EXCAVATING APPARATUS
Fouad K. Mittry, Jr., Los Angeles, and Carl A. Wilms, La Habra, Calif., assignors to Mechanical Excavators, Inc., Los Angeles, Calif., a corporation of California
Continuation of application Ser. No. 177,422, Mar. 5, 1962. This application Oct. 19, 1964, Ser. No. 404,986
19 Claims. (Cl. 37—93)

This is a continuation of application Ser. No. 177,422, filed Mar. 5, 1962 (now abandoned).

This invention relates to excavating machines, and specifically to a wheel excavator having a much greater capacity for its frame size and power requirements than existing wheel excavators.

Accordingly, a primary object of this invention is to provide a wheel excavator having a continuously rotating excavating wheel which discharges directly onto a continuous material removal system, such as a belt conveyor, thereby avoiding the complications and operational difficulties encountered in prior excavators using live rollers, transferring belts, rotating discs and other devices for transferring excavated material from the buckets to the material removal system.

Another object is to provide a wheel excavator having optional discharge spouts, including a novel two-way spout, which makes possible continuous discharge into removal vehicles, such as trucks.

Yet a further object is to provide a wheel excavator having a tail or discharge conveyor which may optionally be maintained stationary during the swing of the wheel, or continuously moved.

Another object is to provide a wheel excavator in which the wheel power is completely mechanical from the power plant to the wheel, the mechanical drive system consisting entirely of driving shafts and suitable gearing, and being extensible and retractable at will to follow the horizontal and vertical movements of the wheel.

Yet another object is to provide a wheel excavator which, for its capacity, is extremely mobile in operation, easily transported in sections by rail or truck from site to site, and is extremely versatile in that the height of cut can be increased by merely repositioning the ladder mast.

Another object is to provide a wheel excavator having a remotely controlled two-way air cylinder operated discharge chute including a deflecting gate which is subject to wear only during loading of one of the two chutes, the remotely controlled system enabling the wheel excavator to be continuously operated.

A further object is to provide a method of continuously loading removal vehicles, such as trucks, from a substantially constant supply of excavated material from a wheel excavator, thereby avoiding surge loads.

A further object is to provide a method of continuously removing, in batches, continually excavated material discharged from a wheel excavator, all the while avoiding surge loads.

A further object is to provide a wheel excavator in which a discharge conveyor mast arrangement and elevating mechanism therefor is eliminated.

Another object is to provide, in the wheel of a wheel excavator, a two-stage planetary gear driving system for the wheel which balances gear tooth loads and provides a large gear reduction, said system being arranged in a sealed chamber for maximum lubrication protection.

Another object is to provide a wheel excavator having a ladder conveyor and a discharge conveyor, each of which is rotatable with respect to the other and to the rotating base, and means for locking the discharge conveyor either to the crawler base, during excavating operations, or to the rotating base which carries the ladder conveyor, during positioning.

Yet a further object is to provide in a wheel excavator as described immediately above, a locking system between the discharge conveyor and the rotating base which is independent of the locking system between the discharge conveyor and the truck base to thereby provide an overlap during the transfer of locking from truck to rotating base so that the conveyor will not free wheel at any time.

Yet a further object is to provide a wheel excavator having a unique wheel drive system, including gear couplings, a pivoting gear box, preferably carried by the wheel ladder, and an enclosed sliding splined drive shaft for transmitting power from the rotating base to the pivoting gear box.

Yet another object is to provide a direct dumping type wheel excavator having a raised ladder belt conveyor so disposed as to be subjected to minimum impact loads from excavated material gravitally discharged from the buckets.

Another object is to provide a wheel excavator having a direct mechanical drive to the wheel, and a completely separate hydraulic drive system for supplemental functions, including incremental system movements such as ladder swing, wheel hoist, and discharge conveyor locking systems.

A further object is to provide in a wheel excavator, a unique method of excavating in which material is dug and dumped at the same time.

Yet a further object is to provide a wheel excavator in which the ladder belt conveyor can be removed for repair or vulcanized while on the ladder by merely disconnecting the wheel and ladder from the remainder of the excavator and removing the conveyor takeup pulley.

Yet a further object is to provide an excavator wheel for use in a wheel excavator in which the wheel buckets are mounted on a conical section and the axis of the conical section is offset from the perpendicular with respect to the ladder belt conveyor, said wheel having bearings so arranged that they substantially straddle the load.

Yet another object is to provide an excavator wheel which may be easily assembled and dismantled despite its relatively large size, said wheel having two separate lubricating systems, one for the wheel gearing and associated structure and the second for the input gear box.

Yet a further object is to provide a wheel excavator in which the speed of the swing of the wheel is automatically increased or decreased in response to the magnitude of the digging load.

Other objects and advantages will become apparent from the following description of the invention.

Our invention is illustrated more or less diagrammatically in the accompanying drawings in which:

FIGURE 1 is a partial side elevation of our wheel excavator illustrating particularly the direct dumping arrangement and the ladder and discharge conveyors;

FIGURE 2 is a side elevation of the balance of our wheel excavator illustrating particularly the discharge conveyor and a two-way discharge spout;

FIGURE 3 is a top plan view of the forward portion of a slightly modified form of our invention;

FIGURE 3a is a view taken substantially along the line 3a—3a of FIGURE 3 with parts omitted for clarity;

Figure 11:
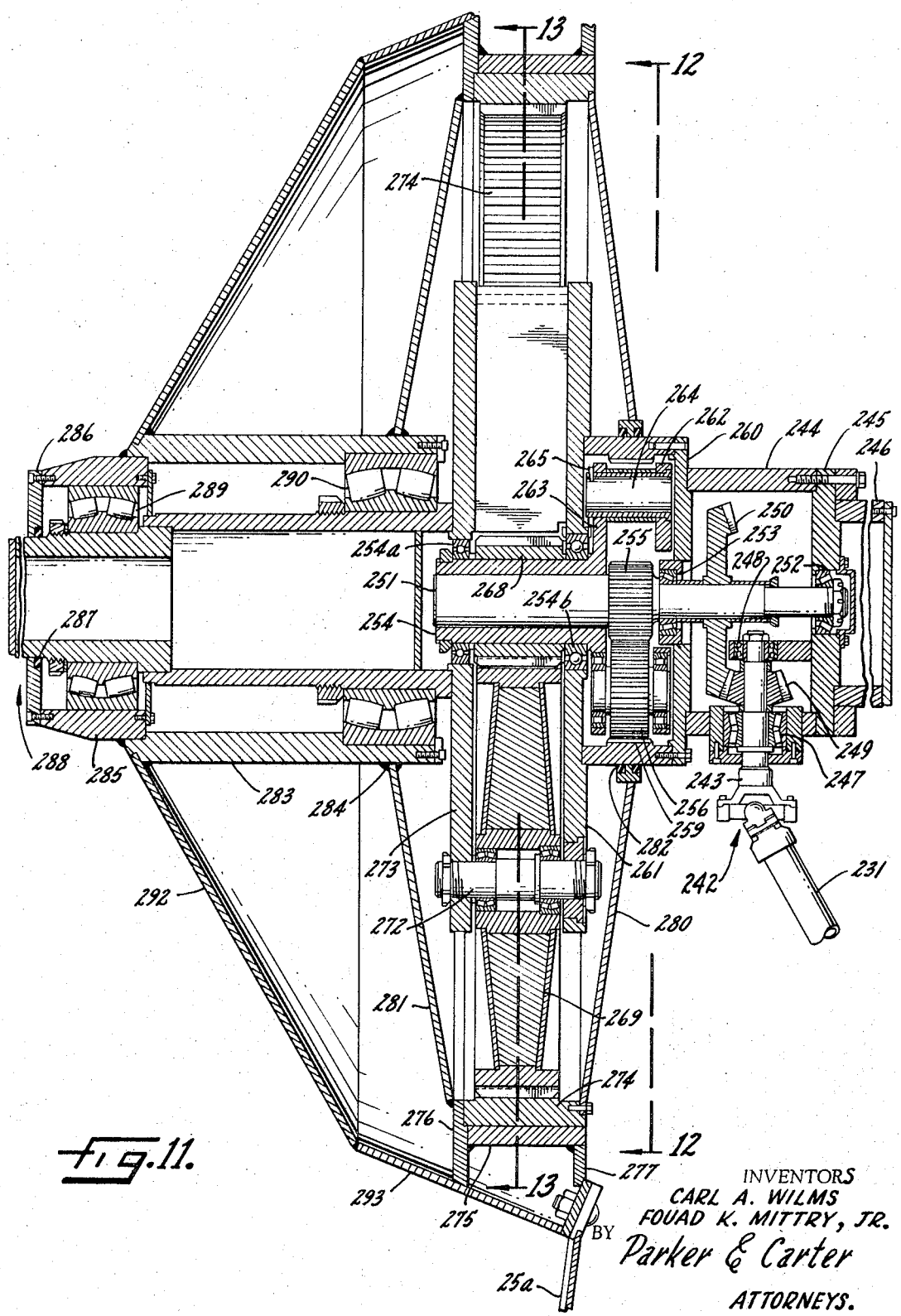
Figure 12:
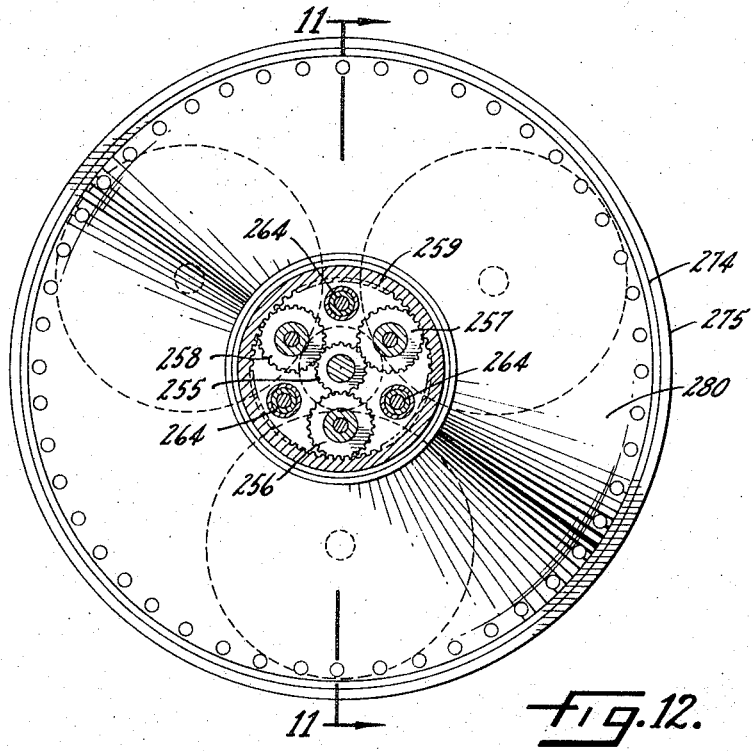
Figure 13:
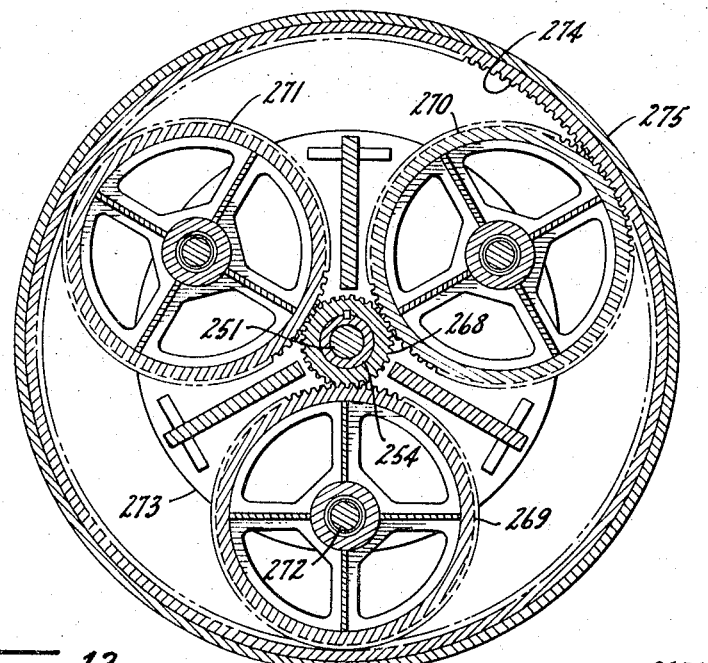
Figure 14:
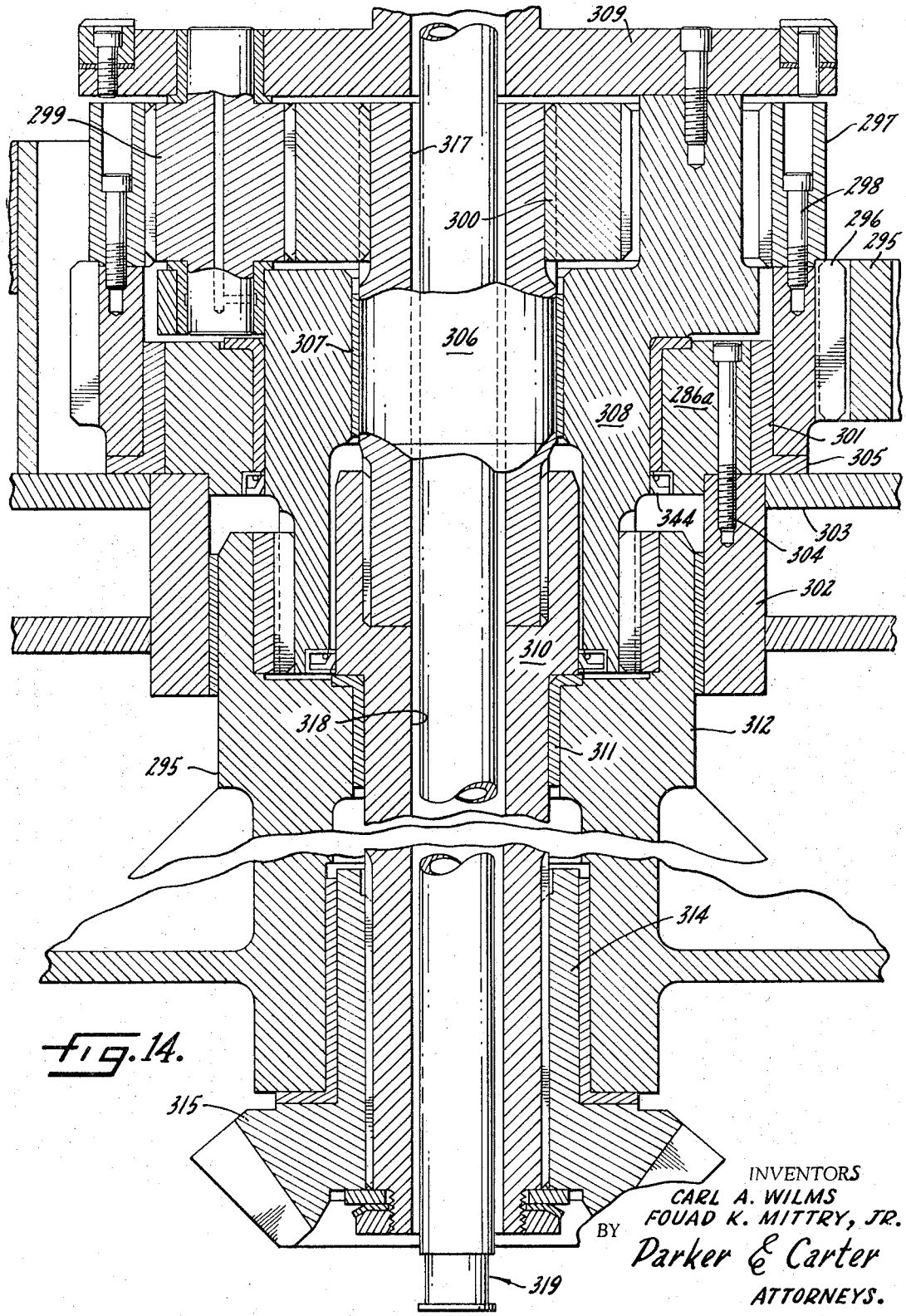
Figure 15:
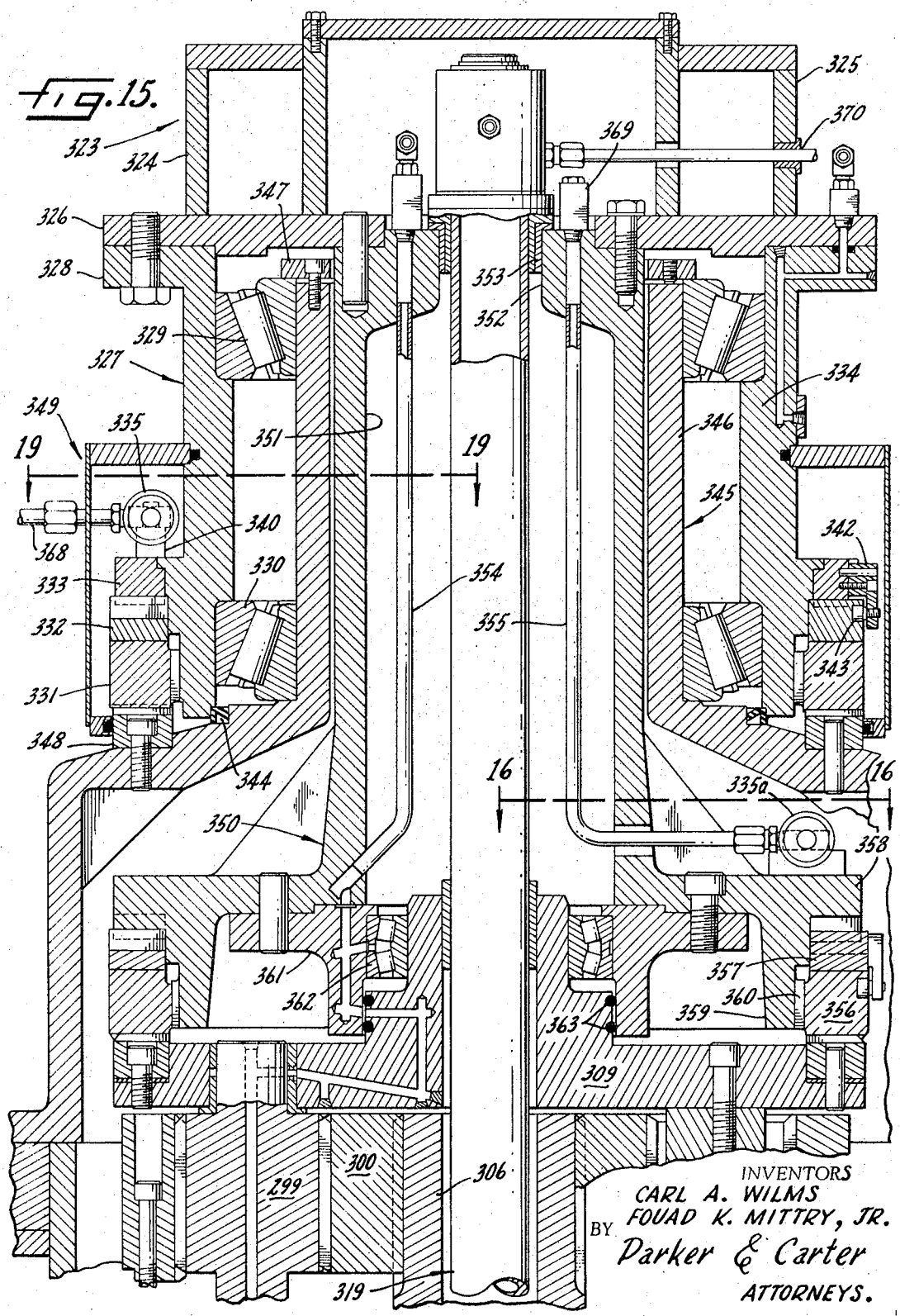
Figure 16:
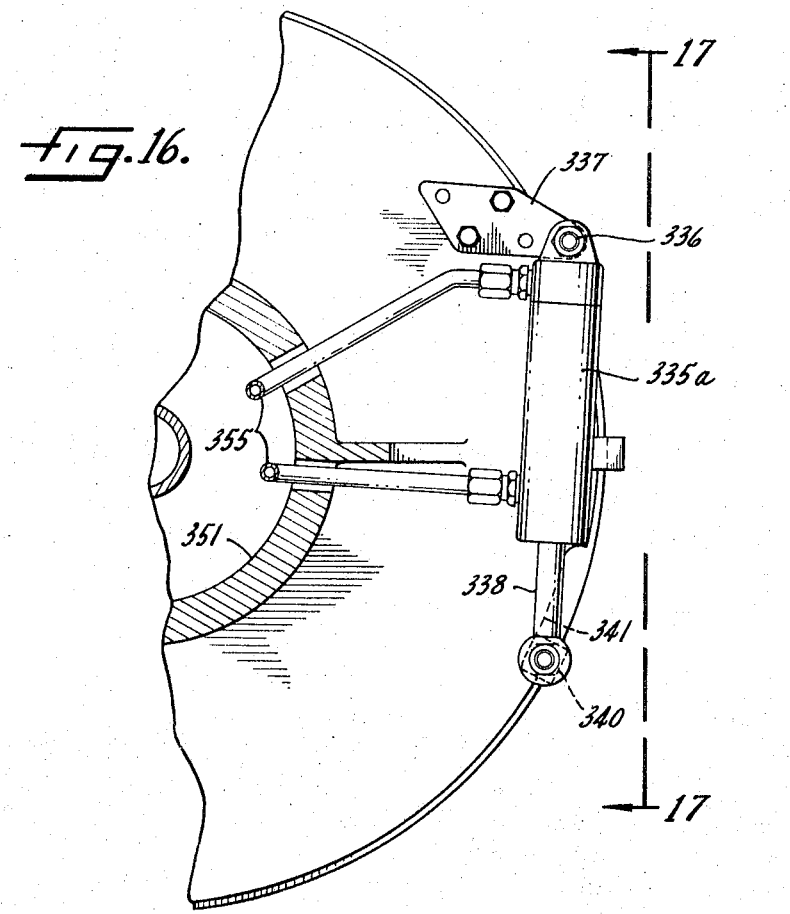
Figure 17:
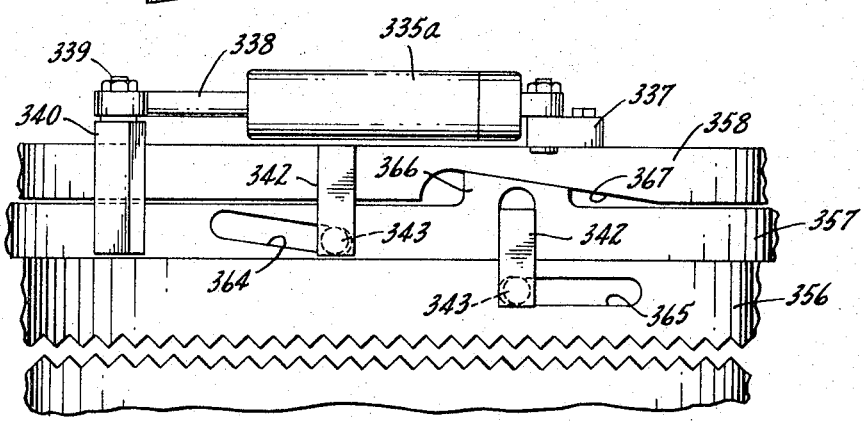

FIGURES 4, 5, and 5a are elevations of optional discharge spouts;

FIGURE 6 is a top plan view of the machinery deck with some parts omitted and others shown diagrammatically for clarity;

FIGURE 7 is a side elevational view of the machinery deck, again with parts omitted and others shown somewhat diagrammatically for clarity;

FIGURE 8 is an elevation with portions broken away of the sliding splined drive shaft assembly for transferring power from the machinery deck to the ladder wheel, the assembly being shown in two positions;

FIGURE 9 is a sectional view to an enlarged scale of the connection between the splined shaft housing and the lower end of the drive shaft of FIGURE 8;

FIGURE 10 is a section through the pivoting gear box taken substantially along the line 10—10 of FIGURE 8;

FIGURE 11 is a section through the direct dumping wheel taken substantially along the line 11—11 of FIGURE 12;

FIGURE 12 is a view taken substantially along the line 12—12 of FIGURE 11;

FIGURE 13 is a view taken substantially along the line 13—13 of FIGURE 11 illustrating, particularly, the second stage of the planetary gear set;

FIGURES 14 and 15 are sectional views with parts omitted for clarity through the lower section of the mechanism for locking and unlocking the wheel ladder with respect to the truck base;

FIGURE 16 is a partial top plan view with parts in section of the mechanism for rotating the discharge conveyor with respect to the truck base;

FIGURE 17 is a view taken substantially along the line 17—17 of FIGURE 16;

FIGURE 18 is a side elevation, partly in section and with other parts removed or shown diagrammatically only of the truck assembly;

FIGURE 19 is a plan view with parts in section of the clutch cylinder assembly associated with the conveyor support housing assembly;

FIGURE 20 is a diagrammatic illustration of the basic components of the hydraulic system;

FIGURE 21 is a sectional view of the modified wheel shown in FIGURES 3 and 3a; and FIGURE 22 is a view taken substantially along the line 22—22 of FIGURE 21.

Like reference numerals will be used to indicate like parts throughout the various views.

Our wheel excavator is indicated generally at 10 in FIGURE 1. It includes a truck assembly, indicated generally at 11, a fixed base, indicated generally at 12, and a rotating base, indicated generally at 13. A power unit, indicated generally at 14, is located at the rear of the rotating base and a transmission unit is indicated generally at 15, just forward of the power unit. A pair of mast plates 16a and 16b extend upwardly and outwardly from the forward end of the rotating base 13. A gantry, indicated generally at 18, is welded, pin connected, or otherwise secured along its lower edge to the mast plates.

A wheel boom or ladder, indicated generally at 20, is pivoted at its inner end to the gantry at 21.

A roughly cone-shaped bucket wheel is indicated more or less in outline at 22. The bucket wheel rotates about a shaft 23 which in turn is carried by suitable support structure 24 at the outer or forward end of the ladder. A plurality of buckets, in this instance six, numbered 25a through 25f, is secured to the periphery of the buckets. As best seen in FIGURE 3, the central plane 25g of bucket 25f, and all other buckets, forms an angle with respect to the central axis of the wheel. Also as best seen in FIGURE 3, the central plane 25g of bucket 25f, and all other buckets, is aligned with and overlies the conveyor 26 during that portion of the rotation of the wheel during which excavated material is discharged from each bucket. Further, the central plane 25g of bucket 25f is substantially co-extensive with the ladder conveyor axis 123 when the bucket reaches the FIGURE 3 position. A body of material, which may of course be either self-sustaining, as would be the case when the machine is used to dig solid earth, or non-self-sustaining, as would be the case when the machine is used as a rehandler to dig into a pile of particulate material, is indicated generally at M.

A ladder conveyor is indicated generally at 26. This conveyor includes a tubular sideframe 27 which supports a plurality of troughing rolls 28. The troughing rolls in turn provide a bed which supports a flexible conveyor belt 29. The drive unit 30, preferably an electric motor, drives the belt at a speed of about 500 ft. per minute through a drive pulley 31. A takeup pulley is indicated at 32 and head and tail pulleys at 33 and 34, respectively.

The cone surface 35 to which the buckets 25 are secured has openings, shown best in FIGURE 1, through which excavated material scooped up by the buckets falls gravitally downward. In operation, material is excavated throughout the arc formed in the bank as viewed in FIGURE 1, and material begins to fall through the mounting plate 35 approximately the time the buckets reach the position of bucket 25f so that the point of transference of material from the bucket as it traverses its path of excavating movement is substantially coincident with a point on the conveyor. Material is therefore simultaneously added to and discharged from each bucket during a portion of the path of excavating movement thereof. By the time the bucket has moved to roughly the position of bucket 25a, the bulk of the material has fallen or is falling downwardly toward the ladder conveyor 26, so that the material is only slightly elevated above the ladder conveyor, and some of it, notably that in the bank ahead of bucket 25f, does not appriciably change positions between its unexcavated position and its point of transference from a bucket to the conveyor. In order to eliminate a high drop of material, and consequent wear and tear on the belt conveyor, the conveyor is elevated above the forward end of the ladder a considerably greater distance than at the rearward end. A plurality of impact idlers, indicated generally at 38, are placed in the area of the greatest impact of excavated material onto the conveyor. Since the particular framework by which the head and tail pulleys, troughing rolls, and driving unit for the conveyor are mounted to the ladder does not form an integral part of the invention, it is not further illustrated since it is considered to be within the skill of the art to mount the conveyor in the position shown. Suffice to say that the conveyor functions as a material removal means which moves material to a discharge zone remote from the wheel, such as the hopper 60 or discharge spout 63.

A stationary plug sheet 39 prevents excavated material in the buckets from falling through the bucket openings in the wheel 35 before the wheel reaches a point at which the conveyor removes it, as best shown in FIGURE 3a. As best seen in FIGURE 1, the plug sheet is located in the lower quadrant inside of the cone-shaped wheel rim 35.

A stationary plug sheet is indicated generally at 40 in FIGURE 3. The plug sheet is a shield inside the wheel which prevents material from falling into the wheel. The lower edge of the plug sheet slightly overhangs the conveyor belt so that any material which is not dumped directly on the belt from the buckets is deflected onto the conveyor belt. The great bulk of material is dumped directly onto the belt without contacting any auxiliary structure between the bucket and the belt.

The ladder and wheel are supported from a mast 44 which is pivoted at 45. A bale 46 is pivoted at its lower end to the ladder structure at 47, and carries a series of pulleys 48 at its upper end. A matching set of pulleys 49 is carried by the upper end of the mast 44, and the wheel is raised and lowered by reeling in and paying out hoisting line 50 which terminates at drum 51. The upper end of the mast is maintained in substantially the position shown during operation by a strut 52 which is pivoted at its forward end to the mast at 53, and at its rearward end to the upper end of the gantry at 54.

An operator's cab is indicated generally at 55 and an access stairway leading thereto at 56. A portion of a vent stack is indicated at 57. In a working embodiment of the invention, the vent stack will extend downwardly and rearwardly to the power unit. The location of the stack in the illustrated position ensures a supply of relatively fresh dust-free air for the internal combustion engines in the power plant. Advantageously the vent may contain a 30,000 c.f.m. electric motor driven axi-vane fan that pressurizes the entire machinery cab to prevent any dust from entering and also provides fresh clean air for the diesel engines. In addition, the outlet for this air in the cab is through the engine radiators at the rear of the cab providing adequate cooling for the engines. The starting and stopping of this fan is thermostatically controlled by the engine water as well as a manual control in the operator's cab.

The ladder conveyor 26 discharges into a hopper 60 carried by the discharge conveyor unit 61. Unit 61 consists essentially of a belt conveyor 62 which discharges into a two-way chute indicated generally at 63. The discharge conveyor includes a substantially rigid tubular framework 64 upon which is mounted a plurality of troughing rolls 65 similar to the troughing rolls on the ladder conveyor. The troughing rolls are more closely spaced together at the tail end of the conveyor, as at 66, to act as impact rollers. The conveyor belt 67 is trained around tail pulley 68, discharge pulley 69, drive pulley 70, and takeup pulley 71. Power is imparted to the drive pulley 70 by a power unit 72, preferably an electric motor having a suitable driving connection to the driving pulley which may be substantially identical to the ladder conveyor drive. The return reach 73 of the conveyor belt is supported by one or more return idler rolls 74.

The tail end of the discharge conveyor is pivotally mounted to the rotating base by a pair of pivot plates 76 which are pivoted at 78 to a conveyor locking and supporting assembly 79. Unit 79 operates to swing the discharge conveyor to any desired position through an arc of approximately 180 degrees about the center line 80, or alternately locks it to the truck assembly 11.

Pairs of suspension cables, one of which is indicated at 81, are pivotally secured to the upper end of the gantry as at 83 by means of swinging yoke plates 84. The outer ends of the cables are connected at 85 to suspension plates 86 secured to the conveyor framework 64. Additional support for the conveyor is provided by intermediate support cables 87 which extend downwardly from the yoke plates 84 to tie plates 89 carried by the framework.

The discharge spout 63 consists of two chutes 90 and 91, a gate 92 which pivots about the axis of the discharge pulley 69, and suitable structural framework 93 which secures the spout to the discharge conveyor framework. Gate 92 includes a pair of side plates 94a, 94b and impact plate 95 shown in section in FIGURE 2. An air cylinder assembly 96 secured to the leading edge 97 of plate 94b swings the gate about its pivot point between the solid and dotted line positions shown in FIGURE 2, depending upon which chute material is to be fed through. In the illustrated solid line position, material passing over the end of conveyor 61 strikes the impact plate 95 and is deflected into inner chute 91. From there it drops into a material receiving area, in this instance a truck 98, waiting below. When a desired mass size has been formed in truck 98, the chute is moved to the dotted line position and the material passes through outer chute 90 and then into truck 99.

Air cylinder 96 may be actuated in various ways. The air lines may be solenoid actuated for example. The driver of a truck may merely press a button suspended from the excavator or supported from the ground after he positions his truck beneath the discharge spout. In FIGURE 2, suitable solenoid valves for causing the pivoted gate 32 to swing to the desired position are actuated remotely from a transmitter in the cab of each truck.

Several modifications of the spout are illustrated in FIGURES 4, 5 and 5a.

In FIGURE 4, the two-way chute has been replaced by a single spout 111 which is supported from the tubular frame 64 at approximately the location of the axis of the discharge pulley shaft by braces 112 secured at their inner ends to the pulley frame and at their outer ends to the sides of the spout. This type of installation is most advantageous when the excavator is to discharge into a more or less permanent material removal system, such as the fixed removal conveyor indicated generally at 113.

In FIGURES 5, 5a another discharge spout arrangement is shown. This arrangement is particularly advantageous for through cut operations having trailing side by side truck haulage. In through cut operation, the excavator advances in one direction. As best seen in FIGURE 5, material discharging over the end of the conveyor pulley impinges against the outer plate 115, and as best seen in FIGURE 5a, then passes into whichever one of the two spouts is open. A pair of reinforcing bracings 116 secure the discharge spout to the conveyor framework. Air cylinder 96, which may be operated by the system illustrated in FIGURE 2, or any equivalent system, determines through which spout the material shall be discharged.

The versatility of our wheel excavator is greatly increased by the optional height positioning arrangement shown best in the phantom portion of FIGURE 1. In this embodiment, the standard strut 52 is replaced by a similar, but shorter, strut 119. In a model having a maximum cutting height of 20 ft. with a standard mast, the cutting height can be increased to 40 ft. with the high mast position. This unique arrangement makes possible the combining of the bail and support structure into one piece fabrication boltable to the ladder. High or low wheel operation is provided with one mast by merely interchanging struts of different length. This provides a very economical conversion from low to high mast position, simplifies the structure, and reduces the projection on the left side of the wheel.

The relationship of the cone bucket wheel to the ladder conveyor 26 is best seen in the top plan view of FIGURE 3. The axis 121 of the wheel is skewed with respect to both the longitudinal axis 122 of the excavator and the axis 123 of the ladder conveyor. The buckets 25a through 25f are likewise skewed with respect to the axis of the cone wheel. These various conponents are so arranged that the wheel buckets 25a through 25f will pass directly over the ladder conveyor during that portion of the time excavated material in each bucket is falling through the plate 35 on the wheel to which the buckets are mounted. The combined effect of the angle of cant of the wheel, which may be described as the angle formed by the canter line 123 of the conveyor 26 and a horizontal radius of the wheel, and the angle of tilt, which may be described as the angular displacement of a cross-section of the wheel in a vertical plane enable the open bottom buckets to discharge with substantially no impact on to the conveyor. As a result, there is no necessity to use rotating discs, live rollers, transfer conveyors, or other devices for transferring excavated material from the buckets to the ladder conveyor.

The power plant and a portion of the power transmission systems are shown in FIGURES 6 and 7.

The rotating base or machinery deck 13 includes the power plant deck 130 and the transmission deck 131. The edges of the transmission deck are bounded by a pair of side plates 132 and 133. A pair of inner plates 134 and 135 extend along the transmission deck parallel to the sideframes for a purpose which will appear hereinafter. A front plate 135 extends across the forward end of the machinery deck. It will be understood that suitable enclosing structure will be utilized to protect the machinery from dust during excavating.

Power to run the excavator wheel and allied systems is derived from two large water cooled diesel engines, 137, 138 located on the power plant deck. The generator engine 138 is governor controlled to maintain approximately 1800 r.p.m. providing 440-volt 60-cycle AC electrical power. The wheel engine 137 is torque converter equipped with a tail shaft governor to maintain 1200 r.p.m. output speed. Dual air intakes having filters for each engine are indicated at 139, and a fuel tank at 140.

Engine shaft coupling 141 connects engine 137 to a bevel gear box 142. The drive shaft from the engine extends through the propel bevel gear box 142 and terminates, at the forward end of the rotating base, at the bevel gear box 143 for the wheel. A shaft coupling 144 connects the wheel gear box 143 to the propel gear box 142. As a result, the input to the wheel gear box is direct from the engine. The wheel gear box and its associated structure will be described in detail hereinafter.

The power system for propelling the wheel excavator is indicated generally at 145. The system is connected by an air operated clutch 146 to the output shaft of engine 137 through a set of bevel gears 147, 148, in the propel gear box 142. A two-speed and reversible planetary transmission is indicated at 149, and a gear coupling at 150. Power is transmitted from the gear coupling to the horizontal propel gear box 151, and from there into the propel drive system, indicated generally at 152.

Engine 137 also drives an air compressor to provide power to brakes, clutches and controls.

Diesel engine 138 is coupled to a 260 kw. maximum capacity, 235 kw. continuous capacity generator 155 which supplies electric current to the conveyor motors, hoist motors, fan motors, and miscellaneous requirements on the excavator. Preferably, the generator will supply 440-volt 60-cycle AC current.

A variable volume hydraulic pump 156 driven by an electric motor 156a is connected by line 157 and 158 to a constant volume reversible hydraulic motor 159 at the forward end of the deck. A valve unit consisting of four solenoid type valves and a relief valve is indicated generally at 156b. A four-way valve in the hydraulic lines 157, 158 for reversing rotation of the hydraulic motor is indicated at 379. The entire hydraulic power unit is mounted on the transmission deck, the base of the unit serving as the cover for an oil reservoir built into the deck structure.

A planetary gear speed reducer indicated at 160 is connected to the motor at its input end, and to a spring seat brake 161 at its output end. Power is transmitted from the brake through the right angle swing drive assembly 162 at which point its direction is altered 90 degrees by suitable gearing, and is then transmitted via gear coupling 163 to a swing drive assembly for swinging the ladder wheel in a horizontal plane. The right angle swing drive for the ladder is indicated generally at 164 in FIGURE 6.

The hoisting assembly for the boom is indicated generally at 170. It includes a gear motor 171 to which power is supplied by conventional electric circuitry from the generator 155. A spring set brake is indicated at 172; the output shaft of the gear motor is connected by a coupling 173 to a speed reducer 174. The assembly described thus far is preferably mounted on a base which is bolted to the deck. Couplings 175, 176 connect hoist drum drive shaft 177 to the double hoist cable drums 178, 179 which are journaled in the projection 180 of the mast plates 16a, 16b. The mast plates extend outwardly and upwardly from the double side plates 132, 134 and 133, 135. The gantry is connected by suitable shafting to the upper end of the mast plates at 181.

As best seen in FIGURE 7, the rotating base 13 carries a plurality of conical rollers 182 which engage track 183 of the fixed base 12.

Power is transmitted from the stationary gear box 143 to the base of the ladder by the power transmission arrangement illustrated best in FIGURES 8, 9 and 10.

Gear coupling 190 connects the output shaft 190a of the output gear box 143 to the splined shaft transmission assembly indicated generally at 191.

The assembly consists essentially of an upper section 192 which slides over the lower section 193. Lower section 193 is essentially a hollow cylinder whose lower end is connected to the output side of gear coupling 190. The upper end of the shaft terminates in an internal ring of splines 194 which engage a complementary series of external splines 195 on splined shaft 196. The housing 192 forms an oiltight lubricant reservoir about the splined shaft 196. A bearing and sealing assembly at the lower end of the housing is indicated generally at 197 and the upper end is bolted to a short connecting collar 198, best seen in FIGURE 10.

Alternately, shaft 196 may be made in two parts, the upper part being journaled in bearing assembly 212 and terminating in a flange bolted to a mating flange on the lower part. Different lengths of shaft 196 can be provided, one for the high lift mast arrangement and one for the standard mast arrangement, as shown in FIGURE 1, or for any other special need.

The details of the connection between the splined shaft and lower section 193 of the transmission assembly is shown best in FIGURE 9. The combination bearing and sealing assembly 197 consists of a pair of ball bearings and races 199 and 200 located between an inner bearing sleeve 201 and an outer sleeve 202, the latter in turn being secured to the housing 192. A bottom cap 203 and an oil seal 204 provide an oiltight lubricant reservoir about the internally splined shaft and that portion of the hollow cylindrical transmission shaft overlapping the splined shaft. An oil drain leading to a sump is indicated at 205.

Connecting collar 198 extends downwardly from a swiveling gear box assembly which is shown generally at 210. Connecting collar 198 is connected by set screws 211 to housing 192. The upper end of the splined shaft 196 is received in a bearing assembly 212 carried by the connecting collar. The connecting collar in turn is welded to the input half 213 of the swiveling gear box assembly. An input bevel gear 214 is bolted to the upper end of the splined shaft 196 and engages a transfer bevel gear 215. Transfer gear 215 is mounted on a short stub shaft 216 which is journaled at its ends in bearing assemblies 217 and 218. The bearing assemblies 217, 218 in turn are supported in journal boxes 219 and 220. The journal boxes are rotatably secured to the sides 213 and 223 of the housing by pivot bushings 221, 224 which mate with swivel rings 222, 225 carried by the housing. Seals 226, 226a are located near the outer periphery of the rotating surfaces.

The transfer gear 215 meshes with output gear 227 which is journaled in output collar 228 by roller bearing assemblies 229, 230. Output shaft 231 is secured to the output gear 227 at its inner end. An air clutch 232 is connected to the output end of shaft 231. The air clutch includes clutch halves 233 and 234 which are engaged and disengaged in a well-known manner by air pressure from rotating air coupling 235. Air pressure to actuate the air clutch is derived from a source connected to inlet 236 by air line 237. Air pressure to finally engage the clutch halves is derived from line 238 which opens into fitting 239. A castellated nut 240 secures the outer half of the air clutch 233 to shaft 231.

Referring now to FIGURE 11, the wheel drive shaft 231 terminates at its input end at gear coupling 242 which couples it to wheel input shaft 243. The wheel input shaft is received in an aperture in the wall of the input bevel gear housing 244. The cap of the housing 245 is bolted to a heavy wheel support shaft 246 which is received in a suitable journal 23, preferably a yoke type journal, best seen in FIGURE 3.

The wheel input shaft 243 is journaled in suitable bearing assemblies 247 and 248 and carries the input bevel pinion 249. Pinion 249 meshes with the input bevel gear 250 which is carried by the wheel drive shaft 251. The wheel drive shaft is supported at its outermost extremity by bearing 252 carried by the cap 245 of the input bevel gear housing 244. The drive shaft is also supported by bearing 253, located approximately midway between its ends, and in a pair of bearings 254a, 254b.

Pinion gear 255 is keyed to the wheel shaft 251 between bearings 254b and 253. Pinion gear 255 meshes with three planet gears 256, 257, and 258 as best seen in FIGURES 11 and 12. These three planet gears in turn mesh with an internal gear 259 formed on the internal surface of a circular housing which consists of the gear, outer wall 260, and the inner wall 261 of the cage for the second gear reduction stage. Each of the three planet gears is carried by a stub shaft which is journaled in a planetary gear cage formed by outer plate 262 and inner plate 263. The plates are pinned together by three pins 264 which extend from plate to plate and are maintained a fixed distance apart by wedges 265 cooperating with apertures in the pin sleeves.

The inner plate 263 of the first stage planetary gear cage is actually a flange or extension of sleeve 254 in which is received the main drive shaft 251. A pinion 268 for the second gear reduction stage is keyed to sleeve 254. This pinion in turn meshes with three second stage planet gears 269, 270 and 271 shown best in FIGURES 11 and 13.

The planet gears carried by planet shafts 272 received in apertures in the outer wall 273 and inner wall 261 of the second reducing stage planet gear cage.

Each of the planet gears in the second stage mesh with internal gear 274 which is welded to a backup plate 275 which in turn is welded to supporting rings 276, 277 for the wheel buckets. A pair of cover sheets 280, 281 extend from the edge of the internal gear 274 inwardly towards the axis of the wheel. Cover 280 terminates at seal 282 and cover 281 is welded to outer sleeve 283 at 284. The outer sleeve 283 is welded to an extension 285 at its left end, to which is bolted a cover plate 286 terminating in a seal 287. A wheel support shaft assembly is indicated generally at 288 supported by suitable bearings 289, 290. The assembly is welded at its inner end to the left wall 273 of the second stage planet cage.

A wheel cover is indicated generally at 292. The cover is welded at its radially inner edge to the outer sleeve 283 of the wheel support structure, and at its outermost edge to bucket mounting plate 293. The bucket mounting plate in turn is welded to plates 276 and 277. A plurality of buckets, such as those illustrated in FIGURES 1 and 3, are welded to the bucket mounting plate.

The propelling system for the excavator, the swing drive for the wheel, and the conveyor locking system are illustrated in FIGURES 14 through 19, with supplemental showings in FIGURES 1, 3, 6 and 7.

The propel drive system will be described first.

Referring to FIGURE 6, power from the horizontal propel gear box 151 is transmitted into the propel drive system 152. By suitable gearing, the power is transmitted downwardly to a propel pinion 320 (FIGURE 18) which meshes with propel idler 295, the left portion of which is shown in FIGURE 14. The propel idler in turn meshes with vertical gear 296 which is secured to a vertical ring gear 297 by a plurality of screws 298, the ring gear in turn meshes with three planet gears 299 which in turn mesh with sun gear 300.

The vertical gear 296 rests upon and slides about a vertical ring gear bushing 301. This bushing fits around vertical propel shaft guide 286a which is bolted to a ring 302 of deck 303 by a plurality of screws 304. The base of vertical gear 296 bears upon flange 305 of bushing 301.

Sun gear 300 is connected by splines to the upper end of hollow splined shaft 306. Shaft 306 rotates in bushing 307 which in turn is received in lower planet cage 308.

The upper end of each of planet gears 299 is journaled in suitable bushings in upper planet cage 309. The lower end of each of the planet gears is journaled in suitable bushings in lower planet cage 308.

The lower end of shaft 306 is connected to the internally splined upper end of the lower vertical propel shaft 310. Shaft 310 rotates in bushing 311 which in turn rests on the truck pintle 312. The truck pintle is non-rotatable and fixed with respect to the ring gear and roller path unit indicated generally at 313 in FIGURE 18. The lower end of shaft 310 is connected by splines to the vertical collar 314 of bevel gear 315. The bevel gear in turn engages suitable gearing which, when activated, moves the crawler truck base assembly 316. Since the power connection between bevel gear 315 and crawler assembly 316 is conventional, it is not further described.

Bore 317 in shaft 306 and bore 318 in shaft 310 are aligned with one another to provide a continuous passage for the reception of truck air shaft 319.

It will thus be seen that power from diesel engine 137 is transmitted to the crawler truck base assembly with a minimum of gearing.

The swing drive system is illustrated best in FIGURES 6, 14 and 18. Power from pump 156 enters the right angle swing drive 164 from the right angle swing drive assembly 162, all as best shown in FIGURE 6. By suitable conventional gearing, power is transmitted downwardly through the power transmission deck and the propel drive idler 295 to a drive pinion 320 shown best in FIGURE 18. It will be understood that drive pinion shaft 31 is rotatable with respect to idler 295 through which it passes so that the shaft and idler may rotate independently of one another. Pinion 320 engages ring gear 322 on thering gear and roller path unit 313, as best seen in FIGURE 18. Since unit 313 is fixed with respect to the crawler truck base assembly 316, rotation of pinion 320 causes the deck assembly, wheel, and all superstructure (except the discharge conveyor when it is locked to base assembly 316), to rotate about truck base assembly 316. This makes possible the swing of the excavator wheel as it cuts a circular swath. Preferably, the angle of swing is at least 180 degrees.

The discharge conveyor positioning and locking system is illustrated best in FIGURES 1, 3, 7, 14 through 17 and 19. The discharge conveyor pivot plates 76, shown best in FIGURE 1, are pivotally connected to a pivoting support 323, shown best in FIGURE 18, by pivot pins 78. Support 323 consists of a pair of plates 324 and 325, shown best in FIGURE 15, which are roughly diamond shaped to provide at their ends, journal members for the pivot pins 78. Side plates 324 and 325 are welded to top plate 326 of the conveyor support housing assembly 327. The housing assembly 327 terminates in a flange 328 which is bolted to top plate 326, as best seen in FIGURES 7 and 15.

The conveyor support housing assembly 327 includes a pair of tapered roller bearings 329 and 330, a movable jaw clutch 331, a center movable conveyor camlock 332, and a flange 333, extending outwardly from the barrel portion 334 of the assembly.

A cylinder clutch assembly which is also part of the housing 327, is shown best in FIGURES 15 and 19. The cylinder clutch assembly includes a clutch cylinder 335 whose inner end is pivoted at 336 to a cylinder bracket 337 which in turn is bolted to flange 333. The outer end of the cylinder rod 338 which, in FIGURE 19, is shown in its extended position, is pivotally connected as at 339 to a connecting rod 340. The lower end of rod 340 in turn is secured to the movable jaw clutch 331, a portion of the flange 333 and camlock 332 being cut away as at 341 to accommodate the connecting rod.

Flange 333 is slidably connected to camlock 332 by a plurality of brackets 342. The upper end of each bracket is bolted to the perphery of the flange and the lower end carries a cam follower 343. The cam follower rides in an inclined slot in the camlock 332. The camlock in turn is connected to the movable jaw clutch 331 by a similar bracket, cam follower and slot arrangement, as will be apparent in connection with the description of FIGURES 16 and 17. A seal 344 which engages the center pin housing 345 completes the housing assembly 327.

The center pin housing 345 terminates at its right edge in a flange which is bolted to the balance of the superstructure on the deck assembly and its left side to the deck assembly.

The center pin housing 345 includes an upper barrel shaped portion 346 to the upper end of which is bolted a retainer ring 347. Retainer ring 347 which overhangs the center pin housing 345 forms an abutment for the inner race of upper bearing 329. A shoulder at the bottom of the barrel portion 346 provides an abutment for the inner race of lower bearing 330. A jaw clutch 348 is bolted to a horizontal ledge on the center pin housing 345.

A sliding housing assembly which encloses the clutch assembly and jaw clutch 348 is indicated generally at 349.

A conveyor truck lock assembly is indicated generally at 350. This assembly includes an upper barrel portion 351 which is received within the barrel portion 346 of the center pin housing 345. The upper end of barrel portion 351 is bolted to plate 326, as best seen in FIGURE 15, and terminates in a cylindrical bore 352. The upper end of the truck air shaft 319 is supported on a bushing 353 which in turn rests on the upper edge of bore 352 in barrel portion 351. The neck or flange portion of barrel portion 351 is apertured to receive a plurality of tubes 354, 355 for admitting air and oil to the working parts therebelow.

The lower end of the truck lock assembly 350 includes a movable jaw clutch 356 and a center pin cam lock 357, both of which are disposed below radial flange 358.

A short barrel portion 359 extends downwardly from flange 358 and is splined at its outer lower end as at 360. These external splines mate with a series of internal splines, not numbered, on the internal surfaces of jaw clutch 356.

The propel assembly illustrated primarily in FIGURE 14 is connected to the truck lock assembly by a center pin support member 361 which encircles the upper planet cage 309. A set of roller bearings are indicated at 362 and suitable seals at 363. The flange of center pin support member 361 is bolted to the mating flange 358 of the truck lock assembly, as best seen in FIGURE 15.

The mechanism for locking the discharge conveyor to the truck assembly is shown best in FIGURES 16 and 17. It will be understood that this mechanism is substantially similar to the clutch assembly mechanism briefly discussed above for locking the discharge conveyor to the rotating base and the description of the following mechanism supplements the description of the FIGURE 19 mechanism.

A clutch cylinder is indicated at 335a, a piston rod at 338, a connecting rod at 340, and a bracket at 337. Bracket 337 connects the inner end of cylinder 335a to flange 358 and connecting rod 340 connects the outer end of piston rod 338 to movable jaw clutch 356. Camlock 357 and flange 358 are cut away as at 341 to accommodate movement of connecting rod 340. Flange 358 is connected to the camlock 357 by bracket 342 having a cam follower 343 which rides along an inclined slot 364 in the camlock.

The camlock in turn is connected to the movable jaw clutch 356 by a similar bracket 342 which carries a cam follower 343 at its lower end which rolls along a horizontal slot 365 in clutch 356. Camlock 357 carries a plurality, preferably three, wedges 366, which slide along complementary inclined surfaces 367 formed in the lower edge of flange 358.

Hydraulic fluid is admitted to and drained from the ends of the clutch cylinder 335a of FIGURES 16 and 17 by fluid lines 355, and from the ends of cylinder 335 of FIGURE 19 by lines 368. Fluid lines 355 and 368 open into suitable fluid connectors 369 which in turn are connected to lines which pass through adjacent housing assemblies, as at 370.

A control system for controlling admission and drainage of hydraulic fluid to the conveyor lock cylinders, depending on whether the discharge conveyor is to be locked to the rotating base or the truck assembly, and the swing motor 159 is illustrated diagrammatically in FIGURE 20. The system includes a conventional variable volume pump 156 having a minimum flow control adjustment, not shown, and a maximum flow control adjustment. The adjusting screw for the maximum flow is indicated at 388.

The pump is driven from electric motor 156a which may be advantageously about 40 horsepower and have approximately a 1200 r.p.m. rating. In one embodiment of our invention the maximum capacity of the pump was rated at 19.8 gallons per minute.

The operation of swing motor 159 is governed by a four-way solenoid valve 379 which may be manually or automatically controlled by the operator in the cab. Thus, the operator may set a pair of adjustable levers which correspond to a given arc of swing of the wheel. When the wheel reaches an end of its arc of swing as set by one of the levers, suitable electrical contacts are closed which energizes solenoid valve 379 to shift its spool, thus reversing the direction of flow of hydraulic fluid and thus the direction of motor 159. It will be understood that a manual control may be provided in the electrical circuitry which will enable the operator to control the arc of swing independently of the automatic means, or to cut in and override the automatic control at any time.

Main line 380 feeds line 381 which admits oil to the cylinder 335 which locks the conveyor to the desk, and line 382 which admits oil to the cylinder 335a which locks the conveyor to the truck. Cylinders 335, 335a are controlled by solenoid valves 383 and 384, respectively.

Two independent but interrelated arrangements for controlling the maximum flow control adjusting screw 388, and thus the speed of swing of the ladder, are shown in FIGURE 20.

A solenoid-controlled cylinder to operate the maximum volume control of the variable volume pump is indicated at 386. The position of the cylinder piston, and thus the position of the adjusting screw 388 which it abuts, is regulated by solenoid valve 385 which controls fluid flow to the cylinder. At a predetermined point in the arc of swing of the wheel when "feathering out" or when a light digging load occurs, solenoid 385 is energized which shifts its cylinder to its upper position. When the cylinder is in its upper position the variable volume pump 156 delivers its maximum volume, thereby speeding up the swing motor 159 for greater operating efficiency in digging to full bucket capacity. When the wheel swings back and reaches the point in its arc of swing when heavy digging is again encountered, the solenoid valve is energized by shifting the cylinder to its lower position so that the pump puts out a minimum volume. This in turn slows down the speed of swing of the wheel to a desired cutting speed which can be adjusted by the minimum volume stop adjustment on the pump. The solenoid is energized or de-energized by actuation of conventional positionable limit switches. Thus, when the operator sets the pointers on the control panel so that the machine swings a preset arc between pointers, the positionable limit switches move with the pointers. In this way the speed-up swing occurs at a preset distance from the limit of the swing regardless of the length or arc the pointers are set to.

A reversing electric motor with a geared head is indicated at 390. The motor is remotely controlled by suitable electric circuits by the operator in the cab. The output shaft of motor 390 may carry a pinion in sliding engagement with the splined exterior of the adjusting screw. Because of the splined connection, the pump output may be adjusted independently of the solenoid control arrangement, yet the motor pinion may remain in engagement with the splined adjusting screw at all times.

A relief valve with a range of 1000 to 3000 p.s.i. is indicated at 387. Another relief valve with a range of 100 to 1500 p.s.i. is indicated at 391. A remote control unit is indicated at 392. This arrangement provides a "back pressure" or resistance to the swing force because the wheel, due to its conical cutting action, will tend to screw itself into the cut. A reservoir, return lines, filters, check valve, pressure gauge and manual shutoff valve are all indicated diagrammatically. Accumulator 393 maintains pressure for the jaw clutches during the time the swing motor is not operating.

In FIGURES 21 and 22 a modified wheel structure is shown. In this modification the wheel drive shaft 400 enters the input drive bevel gear box 401 at an angle, as constrasted with the right angle arrangement of FIGURE 11. This enables the drive shaft to parallel the ladder conveyor and eliminates the universal joint illustrated in the FIGURE 11 structure.

Drive shaft 400 carries a bevel gear 402 supported between bearings 403 and 404. Gear 402 in turn meshes with bevel gear 405 carried at the right end of input shaft 406 which in turn is supported by bearings 407, 408. It should be understood that gear 405 could just as advantageously be located at the left end of shaft 406. In this event a mounting plate to which the slope sheet may be attached could be secured to the right end of housing 401, the mounting plate lying generally parallel to plate 436. Housing 401 is bolted to outer wall 409 as at 410. Input shaft 406 terminates in an internal spline 411. Internal spline 411 in turn meshes with the external spline on the outer end of shaft 412, the shaft carrying central pinion gear 255. Seals 415 and 416 separate the bevel gear box from the interior of the wheel. The splined joint and bolts 410 enable the input gear box to be easily dismantled from, and assembled to, the balance of the wheel.

The arrangement of the small planet gears which mesh with pinion 255, internal gear 259, second stage planet gears 269, and second stage internal ring gear 417, is substantially the same as shown in the FIGURE 11 embodiment.

In this instance, however, the wheel structure has been modified to straddle-mount the bearings, thereby placing the innermost bearing more directly under the bucket load.

The wheel hub consists of conical plate 419 and radial tubular ribs 418 which terminate at their apex at a ring 420. A center tube 421 is welded to the innermost periphery of ring 420 and a plurality of gusset plates 422 is spaced about tube 421 and conected thereto, and to radial tubular ribs 418. Ring 420 carries the outer bearing race of an X bearing 424. The inner race of the bearing abuts a retaining shoulder on the outer end of wheel support shaft 423 and an X bearing is disposed between the inner and outer races to take both thrust and radial loads. The outer bearing race is apertured as at 425 in line with apertures 426 in the ring 420. This enables oil which is carried upwardly by the gusset plates, which act as scoops, to run down through tube 418 to the bearing 424.

The outer end of the wheel support shaft is closed by plate 428. The shaft is grooved as at 429 and a mating yoke is indicated at 430. A rib 431 formed on the inner periphery of yoke 430 is received in groove 429 to prevent unintended longitudinal movement of the yoke and wheel shaft.

Shaft 423 is bolted to the left wall 273 of the second reducing stage planet gear cage as at 432. A series of apertures 433 adjacent the inner end of the shaft enable oil carried upwardly by the gusset plates to enter the shaft and reach the bearings and gearing.

The inner hub of the wheel is formed by a conical plate 436 and radial tubular ribs 435. These plates terminate at their apex at a bearing ring indicated generally at 437. The bearing ring receives the outer race of a large radial bearing 438. The inner race is secured to the outer wall of internal ring gear 259. A plurality of roughly triangular reinforcing plates is indicated at 440. The plates are welded along their hypotenuse to the radial tubular ribs 435 and along their base to a short circular ring 441.

An outer wheel hub seal is indicated at 442 and an inner seal at 443.

It will thus be seen that power from drive shaft 400 when transmitted by the various gears to second stage planetary ring gear 417 will cause the wheel to rotate about shaft 423 and first stage planetary ring gear 259.

Plate 419 and ribs 418 are welded at their bases to a backup ring 445. An inwardly extending flange 446 and an overlapping flange 447 form a seat for second stage planetary ring gear 417. Plates 436 and ribs 435 are welded at their bases to a securing ring 448. Securing ring 448 and internal ring gear 417 are bolted to backup ring 445 as at 449.

The wheel rim is indicated generally at 450. The rim comprises an inner ring 451 which is bolted to the backup ring 445 as at 452 and 453. A bucket mounting plate is indicated at 454 and a backup plate at 455. It will be understood that parallel plates 454, 455 have aligned apertures therein through which material scooped up by the buckets falls when each bucket reaches approximately the position of bucket 25f in FIGURE 1.

In FIGURE 22 the inner portion of the wheel support shaft is indicated at 461. The shaft is located at an angle with respect to the axis of the wheel to thereby enable the wheel to be angled upwardly from the plane of the ladder belt conveyor. The outer end of angled portion 461 is received in suitable yokes carried by the outer wheel support structure.

We claim:
1. In combination in a wheel excavator,
a base assembly,
a ladder assembly carried by the base assembly,
said ladder assembly carrying a first conveyor,
a second conveyor and means for supporting it relative to the base assembly,
means for varying the angle between the two conveyors,
said conveyors being so positioned that the first conveyor discharges into the second conveyor in all relative positions of said conveyors with respect to one another whereby material received at a loading point on the first conveyor may be discharged at a discharge point on the second conveyor, and
an excavator wheel carried by the ladder assembly,
said excavator wheel having a plurality of material receiving receptacles spaced about its periphery which traverses a closed path for digging material and moving said material through a portion of said closed path to a transfer area entirely circumscribed by said closed path,
said excavator wheel and first conveyor being so disposed with respect to one another that material in the material receiving receptacles is placed directly on the first conveyor from the receptacles with substantially no impact in a position circumscribed by the closed path of travel of receptacles which underlies said transfer area, and in a direction having a substantial component which is in axial alignment with said first conveyor.
2. The combination of claim 1 further characterized firstly, in that the receptacles are carried by a frame which, when rotated, causes the receptacles to move along a circular path lying in a single plane, said frame having an opening therein beneath each receptacle through which material from the receptacle associated with each opening may pass when discharging, and
secondly, in that the plane of rotation of receptacles is canted and tilted with respect to the vertical axial plane of the conveyor whereby material in the receptacles may be passed through the frame in the course of its direct placement on said first conveyor.
3. The combination of claim 2 further characterized in that
that portion of the first conveyor on which material in the receptacles is directly deposited is located generally below and adjacent to the path of travel of the receptacle openings.

4. The combination of claim 2 further characterized in that the portion of the receptacle frame which carries the receptacles is conical.

5. The combination of claim 1 further including means for locking the second conveyor to either a truck assembly or a deck to thereby prevent free wheeling of said second conveyor.

6. The combination of claim 5 further characterized in that said second conveyor locking means includes
two pairs of locking cams and power means for rotating one cam in each pair of cams with respect to the other cam in each pair,
one cam in the first pair of locking cams being carried by and movable with the second conveyor and the other cams being carried by and movable with the base assembly,
one cam in the second pair of locking cams being carried by and movable with the second conveyor and the other cam being carried by and movable with the base assembly, and
hydraulic means for maintaining one of the cams carried by the second conveyor in engagement with its associated cam at all times.

7. The combination of claim 1 further including a multi-direction discharge spout assembly for the second conveyor operable to direct excavated material into any one of a plurality of material receiving zones, and
means for selecting and actuating the particular discharge outlet associated with a particular material receiving zone.

8. The combination of claim 7 further characterized in that the discharge spout assembly includes a deflector, which, when moved to alternate positions, deflects excavated material carried by the second conveyor into one of a plurality of discharge outlets.

9. The combination of claim 8 further characterized in that the means for selecting the desired discharge outlet and actuating the deflector may be remotely actuated from a point spaced from the excavator.

10. The combination of claim 9 further characterized in that the deflector is solenoid controlled, the circuit for said solenoid including a receiver, and a transmiter operable from a remote point capable of emitting a signal which, upon reception by the receiver, actuates the control solenoid.

11. The combination of claim 8 further characterized in that the discharge outlets are arranged tandemly and in general parallelism with the second conveyor.

12. In a wheel,
receptacle means traversing a closed path for digging material and moving said material through a portion of said closed path to a transfer area entirely circumscribed by said closed path and proximate to said portion of said closed path,
elongated material removal means in substantial vertical alignment with said material moving portion of said closed path of travel of the receptacle means and having a material receiving portion underlying said transfer area, whereby said receptacle means discharges directly onto the material removal means with substantially no impact, said discharge of material being in a direction having a substantial component which is in axial alignment with said material removal means.

13. The combination of claim 12 further characterized in that the wheel is an excavator wheel.

14. The combination of claim 12 further characterized in that the material removal means extends unidirectionally from the wheel to a remote discharge point.

15. The combination of claim 14 further characterized in that the receptacle means traverses a generally circular path.

16. The combination of claim 15 further characterized in that the
receptacle means are open bottom buckets mounted for rotation with the wheel,
said wheel being so disposed with respect to the material removal means that the open bottom buckets are in a discharging position when they pass over said material removal means.

17. The combination of claim 15 further characterized in that the plane of rotation of the wheel is canted and tilted with respect to the material removal means.

18. The combination of claim 17 further characterized firstly, in that the material removal means is a belt conveyor,
secondly, in that the material receiving means includes a plurality of open bottom buckets, and
thirdly, in that the elongated material removal means is a belt conveyor, the tail end portion of said conveyor being closely spaced to the open bottoms of the buckets in material receiving relationship therewith at one area in the path of travel of said buckets.

19. The combination of claim 14 further characterized in that the remote discharge point is a transfer point between two material removal means which are disposed in material transfer relationship to one another.

References Cited

UNITED STATES PATENTS

| | | | |
|---|---|---|---|
| 796,477 | 8/1905 | Wallace | 198—68 |
| 1,808,898 | 6/1931 | Kerr | 212—69 |
| 2,621,045 | 12/1952 | Montooth | 192—93 X |
| 2,909,855 | 10/1959 | Kolbe | 37—96 X |
| 3,091,874 | 6/1963 | Wuigk | 37—190 |

FOREIGN PATENTS

| | | |
|---|---|---|
| 600,965 | 8/1934 | Germany. |
| 635,375 | 9/1936 | Germany. |
| 719,998 | 4/1942 | Germany. |
| 740,716 | 10/1943 | Germany. |
| 871,576 | 3/1953 | Germany. |
| 30,093 | 12/1913 | Great Britain. |

OTHER REFERENCES

German printed application: A 17,667, June 1956.
German printed specification: 1,012,265, July 1957.

ABRAHAM G. STONE, *Primary Examiner*.

J. R. OAKS, *Assistant Examiner*.